Figure 3:
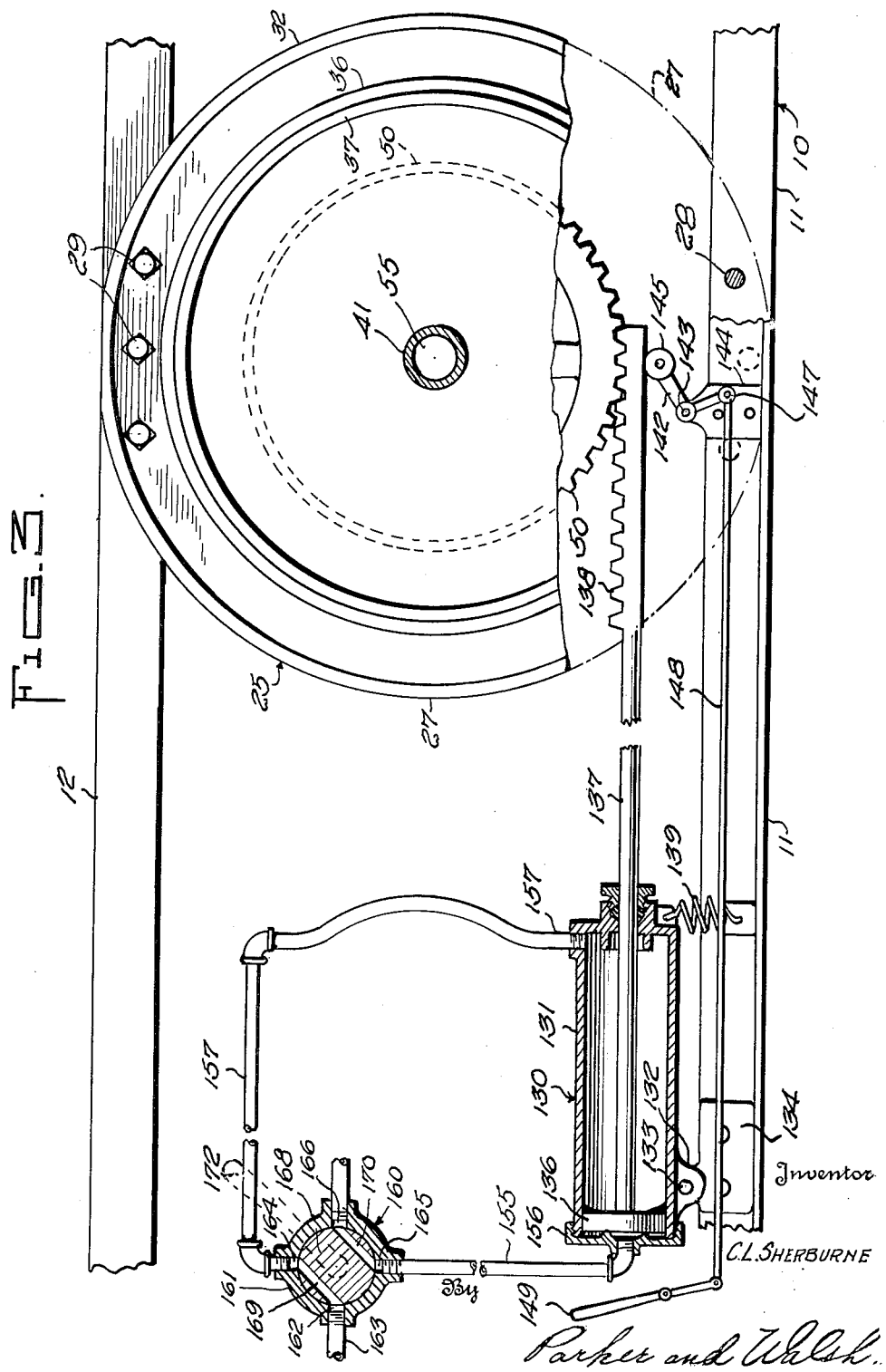

Dec. 9, 1952  C. L. SHERBURNE  2,621,072
HORIZONTALLY SWINGING DUMP BODY TRUCK
Filed Feb. 16, 1949  3 Sheets-Sheet 1
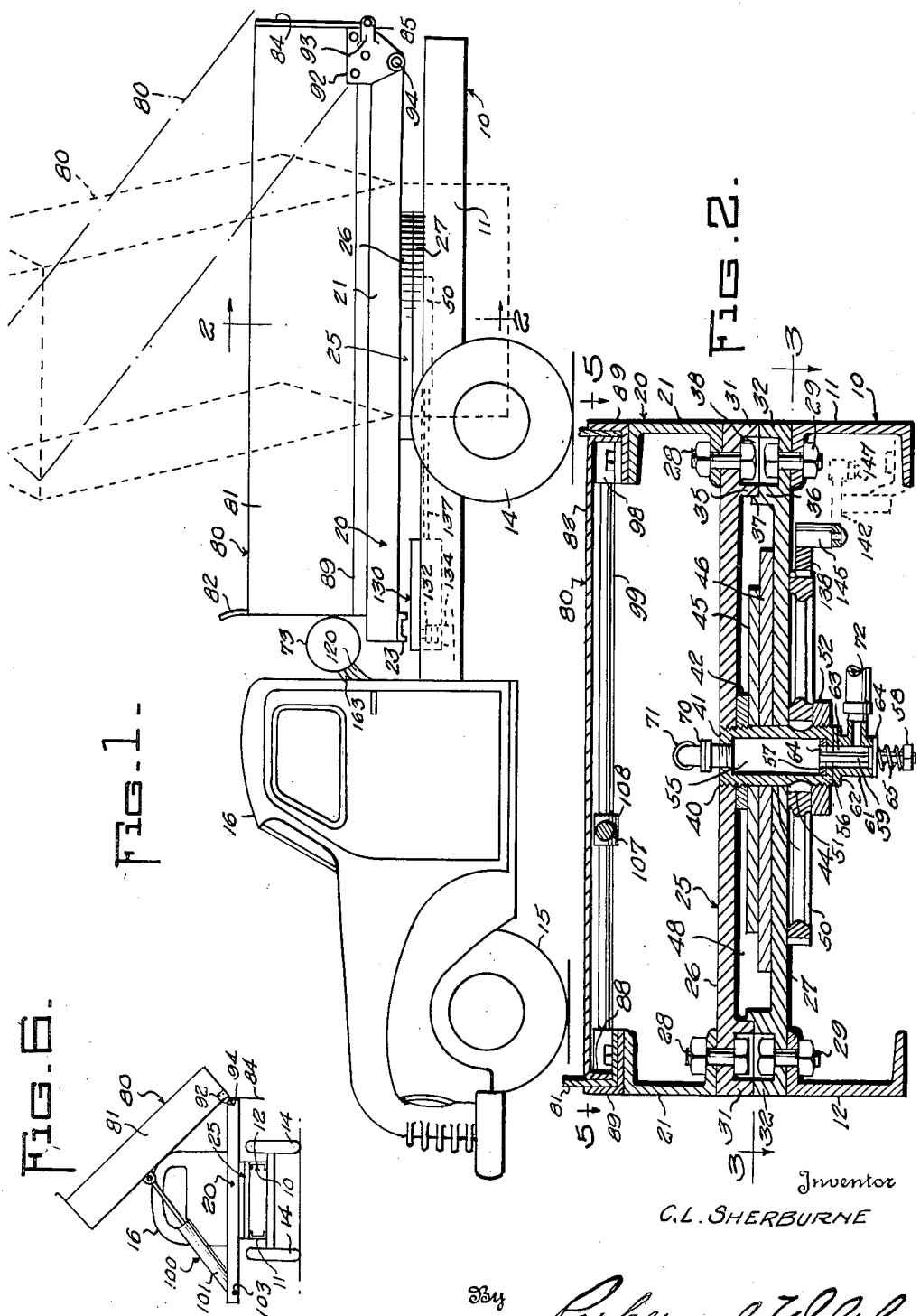
Inventor
C. L. SHERBURNE
By Parker and Walsh
Attorney Dec. 9, 1952 C. L. SHERBURNE 2,621,072
HORIZONTALLY SWINGING DUMP BODY TRUCK
Filed Feb. 16, 1949 3 Sheets-Sheet 2

Inventor
C. L. Sherburne
By Parker and Walsh

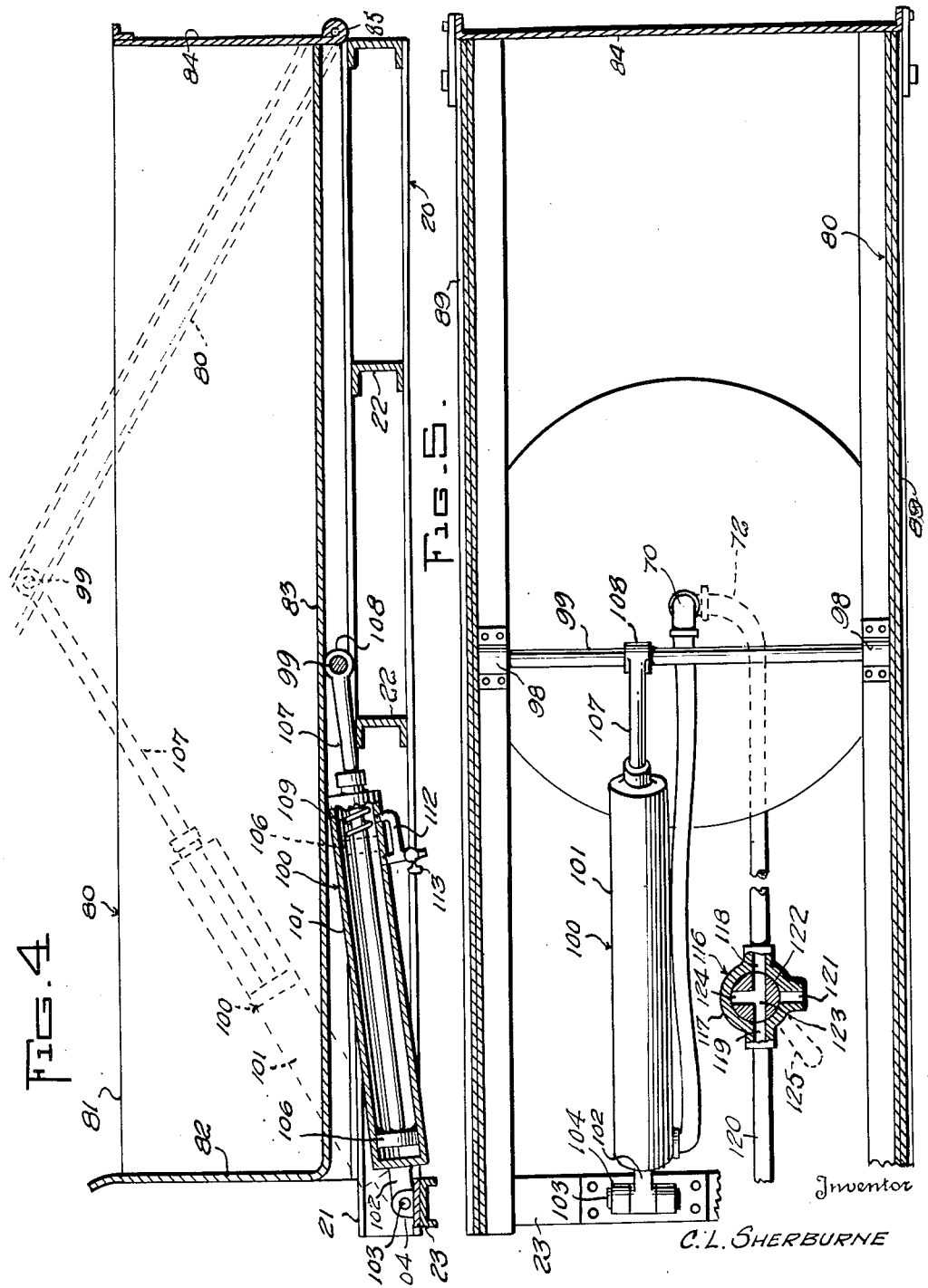

Patented Dec. 9, 1952

2,621,072

UNITED STATES PATENT OFFICE 2,621,072

HORIZONTALLY SWINGING DUMP BODY TRUCK

Claude L. Sherburne, Topeka, Kans., assignor of one-half to Judson Ayres Scott, Leavenworth, Kans.

Application February 16, 1949, Serial No. 76,781

16 Claims. (Cl. 298—9)

This invention relates to a rotating body dump truck.

As is well known, it is the common practice in the manufacture of dump trucks to support a dump body above the chassis frame and to hinge the body for turning movement on a transverse axis adjacent the rear end of the body to permit the forward end to be moved upwardly to dump material from the body. It is also the common practice to provide power sources for elevating a truck body to dump the material. These conventional dump truck body constructions are disadvantageous for the reason that material can be dumped only from the rear end of the truck. It frequently is desirable to dump the material to one side or the other of the truck, and it frequently is wholly impracticable to turn the truck in backing to place the rear end of the truck off a driveway or the like to dump the material. In such case, it is necessary to dump the material from the rear end of the truck and then move it from the road or driveway to the desired point. This obviously involves much labor and a substantial loss of time.

An important object of the present invention is to provide a dump truck having a material-holding body so arranged that it may dump material rearwardly of the truck or to either side thereof, thus making it far more practicable to dump material at the point where it is desired.

A further object is to provide such a construction wherein the body is supported on a rotatable structure which may be turned in either direction from the normal position to dump material from the truck at either side thereof, and to provide novel and easily operable means for turning the body to the desired angle before dumping.

A further object is to provide novel means, easily controlled from the cab of the vehicle, for power-operating the rotating structure to turn the body to any desired point before dumping.

A further object is to provide novel means for supporting the rotatable structure and to utilize such means for connecting to a source of fluid pressure the power means employed for dumping the body whereby such dumping operation may be performed regardless of the angularity of the dump body relative to the chassis frame.

Other objects and advantages of the invention will become apparent during the course of the following description.

In the drawings, I have shown one embodiment of the invention. In this showing,

Figure 1 is a side elevation of a truck embodying the invention, a portion of the truck body being shown in broken lines in the rearward dumping position and in dotted lines in a side dumping position, Figure 2 is a vertical sectional view taken on line 2—2 of Figure 1, the upper part of the dump body being broken away, Figure 3 is a horizontal sectional view taken substantially on line 3—3 of Figure 2, parts being broken away and the control valve mechanism being diagrammatically represented in section, Figure 4 is a vertical longitudinal sectional view through the dump body and the rotatable supporting structure therefor, Figure 5 is a section on line 5—5 of Figure 2, the control valve being diagrammatically shown in section, and Figure 6 is a diagrammatic rear elevation on a reduced scale, showing the dump body in an elevated dumping position for dumping material to one side of the truck.

Referring to Figures 1 and 2, the numeral 10 designates the chassis frame of a motor truck comprising side frame members 11 and 12 which may be formed of channel section as shown in Figure 2. These frame members are suitably braced relative to each other in the conventional manner (not shown). The chassis frame is supported by the usual rear wheels 14 and front wheels 15, and any type of cab and body structure 16 may be mounted on the forward end of the vehicle.

A supplemental frame indicated as a whole by the numeral 20 is mounted above the chassis frame 10 and comprises parallel frame members 21 which may be similar in structure to and normally arranged respectively over the chassis frame members 11 and 12. The supplemental frame 20 has its frame members 21 suitably braced by cross members 22 at desired points, and one cross member 23 (Figures 4 and 5) is arranged at the forward end of the supplemental frame. The cross member 23 is preferably of inverted channel section and is secured in any suitable manner, for example by welding, against the bottom of the frame members 21.

The supplemental frame 20 and chassis frame 10 are connected by a fifth wheel structure indicated as a whole by the numeral 25 and illustrated in detail in Figure 2. This structure comprises upper and lower circular relatively heavy plates 26 and 27 respectively connected at opposite sides of the vehicles to the respective frames 20 and 10 by bolts 28 and 29. The plates 26 and 27 carry the load of the frame 20, the body to be referred to later, and the load carried by the body. To this end, the plate 26 is provided with an integral downturned annular flange 31 bearing on the upper edge of an upturned annular flange 32 formed integral with the plate 27. The contacting edges of the flanges 31 and 32 are machined to provide a bearing fit therebetween.

Preferably, but not necessarily, the plate 26 is provided with a second depending integral annular flange 35 of smaller diameter than the flange 31 and bearing upon an annular flange 36 formed integral with the plate 27 and shouldered as at 37 to absorb lateral thrusts. The space between the flanges 31 and 32 and flanges 35 and 36 may form a lubricant chamber 38.

The plate 26 is provided with a threaded axial opening 40 to receive the threaded upper end of a cylindrical king pin 41 fixed in position relative to the plate 26 by a lock nut 42. The plate 27 is apertured as at 44 to provide a bearing opening for the king pin 41 as shown in Figure 2. Spacer plates 45 and 46 are arranged between the plate 27 and lock nut 42. The space 48 between the plates 26 and 27 inwardly of the flanges 35 and 36 also may form a lubricant chamber to lubricate the bearing opening 44.

Beneath the plate 27 is arranged a gear 50 keyed as at 51 to the king pin 41. A lock nut 52 is threaded on the lower end of the king pin to maintain the gear 50 in proper position.

As stated, the king pin 41 is cylindrical, thus providing a chamber 55 therein which forms part of a fluid pressure passage to be referred in detail. The lower end of the king pin is turned inwardly to form a flange 56 against which is seated the head 57 of a bolt 58, the shank 59 of which is substantially smaller than the opening within the flange 56. A casing 61 surrounds the bolt shank 59 and has an out-turned flange 62 at its upper end seated against the bottom of the king pin. The space 63 around the bolt shank 59 forms a part of the fluid pressure passage and this space communicates with the chamber 55 through openings 64 formed in the head 57. A cap 64 seats against the bottom of the sleeve 61 as shown. A compression spring 65 surrounds the bolt shank beneath the cap 64 and the bottom nut of the bolt, thus urging the cap 64 upwardly and the head 57 downwardly. This reactionary spring force thus seats the cap 64 in leakproof engagement with the bottom of the sleeve 61 and maintains the flange 62 of this sleeve in leakproof engagement with the bottom of the king pin 41.

A fitting 70 (Figure 2) is threaded into the top of the king pin 41 and is connected to one end of a flexible hose 71 leading to a fluid pressure motor to be described. A fluid pressure inlet pipe 72 is tapped into the sleeve 61 and leads to a source of pressure fluid, for example a tank 73 (Figure 1), through means to be described. The pipe 72 is flexible and permits the king pin 41 to turn at least 80 degrees either to the right or left from the normal position of the supplemental body 20 relative to the chassis 10.

A dump body indicated as a whole by the numeral 80 is arranged above the supplemental frame 20. The dump body comprises side walls 81, a front wall 82 and a bottom wall 83, and the body is provided with a conventional tail gate 84. This gate is supported for pivotal movement to open position by pins 85 supported in a manner to be described. Referring to Figure 2, it will be noted that the side walls 81 extend to the bottom of the body adjacent downturned flanges 88 formed on the bottom wall 83, and these elements are arranged within angle iron reinforcing members 89. The rear end of the dump body is provided at each side thereof with a heavy cast bracket 92 having an integral rearward extension 93 carrying the pivot pins 85 of the tail gate. The brackets 92 extend downwardly over the sides of the frame members 21 for pivotal connection with heavy trunnions 94 carried by the frame members 21. These trunnions support the dump body for upward swinging movement to the dotted and broken line positions shown in Figures 1 and 4 and shown in solid lines in Figure 6.

The angle iron reinforcing members 89 (Figure 2) are provided with bearings 98 supporting a transverse shaft 99. A fluid pressure motor indicated as a whole by the numeral 100 (Figures 4 and 5) transmits force to the shaft 99 to raise the body 80 to dumping position.

The motor 100 comprises a cylinder 101 having a heavy ear 102 at one end rotatably connected to a shaft 103 mounted in bearings 104 secured to the cross member 23. A piston 106 is mounted in the cylinder 101 and is connected to a piston rod 107 having a bearing 108 at its free end surrounding the shaft 99. A cushion spring 109 is mounted in the end of the cylinder 101 to cushion movement of the piston 106 when it reaches such end of the cylinder.

Adjacent the same end thereof, the cylinder is provided with a by-pass pipe 112 to bridge around the piston 106 when the latter is adjacent the dotted line position thereof shown in Figure 4. A manually controllable valve 113 may be opened to connect the by-pass pipe to the atmosphere for a purpose to be described.

The fluid pressure pipe 72 leads to the cab 16 of the vehicle, and at a point accessible to the operator, there is arranged a three-way valve indicated as a whole by the numeral 116. This valve comprises a casing 117 having a port 118 communicating with the pipe 72. The casing has a second port 119 communicating with a pipe 120, leading to the pressure tank 73 (see Figure 1). The valve casing 117 is provided with a third port 121 open to the atmosphere. A valve 122 within the valve body 117 is provided with a through passage 123 and a branch passage 124. The valve 122 may be turned in any suitable manner, for example by a handle 125 indicated in dotted lines in Figure 5. When the valve 122 is in the position shown, fluid pressure will be admitted to the lower forward end of the cylinder 101. If the valve is turned 90° clockwise from the position shown, pressure through pipe 71 will be shut off and the cylinder 101 will be exhausted to the atmosphere through port 118, passages 124 and 123 and port 121.

In Figure 3, there is illustrated the means for rotating the supplemental frame 20 and body 80 to turn the latter to an angular position for dumping. A fluid pressure motor indicated as a whole by the numeral 130 is employed for this purpose. This motor comprises a cylinder 131 having an ear 132 at one side thereof pivotally connected by a vertical pin 133 to a bearing bracket 134 secured to the chassis frame member 11. A piston 136 is mounted in the cylinder 131 and is carried by a piston rod 137 extending rearwardly and provided with a rack 138 adapted to mesh in a manner to be described with the gear 50. A tension spring 139 is connected to the cylinder 131 to normally swing the rack 138 out of engagement with the gear 50.

A bell crank lever 142 is pivoted as at 143 intermediate its ends on a bearing bracket 144 secured to the frame 11. One end of the bell crank lever carries a roller 145 engageable with the face of the piston rod 137 opposite the rack 138. The other arm of the lever 142 is pivotally connected as at 147 to a rod or similar motion transmitting connection 148 leading to the cab of the vehicle and provided with an operating lever 149. When the lever 149 is pushed forwardly, the roller 145 engages the piston rod 137 to move the rack 138 into engagement with the gear 50. When the lever 149 is released, the bell crank lever 142 is free to turn and the spring 139 moves the rack 138 out of engagement with the gear 50.

A pipe 155, preferably having a flexible section adjacent the motor 136, is tapped through one head 156 of the cylinder 131. Adjacent the other end of the motor, a pipe 157 is tapped into the cylinder 131 and preferably has a flexible section adjacent the motor 130 whereby the latter is free to pivot on the axis of the pin 133.

A four-way valve indicated as a whole by the numeral 160 controls the application of fluid pressure to the motor 130. The valve 160 comprises a casing 161 having a port 162 connected to a pipe 163 leading to a source of fluid under pressure, for example the tank 73. A second port 164 through the casing 161 is connected to the pipe 157. A third port 165 of the casing 161 is connected to the pipe 155 while the fourth port 166 is open to the atmosphere. A valve 168 is arranged in the casing 161. This valve is provided with a pair of passages 169 and 170 normally positioned as shown in Figure 3. The valve 160 is arranged in the cab of the vehicle, easily accessible to the driver, and is provided with a suitable operating handle, as suggested by the dotted lines 172.

*Operation*

The parts normally occupy the positions shown in solid lines in Figures 1 and 4 of the drawings. When it is desired to dump material from the body 80 rearwardly of the truck, the motor 130 (Figure 3) will remain inoperative, and the operator will control the motor 100 (Figures 4 and 5) by operation of the valve handle 125. The pipe 71 is adapted to communicate with the source of fluid pressure through the king pin 41 and associated passages, and through pipe 72, leading to the pressure source. The pipe 71 is flexible and permits swinging movement of the cylinder 101 on the axis of the pin 103. The valve 122 is normally turned to a position 90° clockwise of the position shown in Figure 5, the lower forward end of the cylinder 101 thus normally being vented to the atmosphere. The operator will turn the valve 122 from such normal position counterclockwise to the position shown in Figure 5, thus moving the passage 124 out of engagement with the port 118 and connecting the ports 118 and 119 through passage 123. Compressed air or other pressure fluid will then flow into the cylinder 101 moving the piston 106 rearwardly and thus elevating the body 80 as shown in dotted lines in Figure 4. With the tail gate 84 dropped to open position, material will be dumped from the truck body. The upper or rear end of the cylinder 101 preferably has very slight communication with the atmosphere to bleed it to the extent necessary for free movement of the piston 106 to and slightly beyond the dotted line position shown in Figure 4.

As the piston moves to the dotted line position referred to, it will compress and load the spring 109, at the same time connecting the cylinder on opposite sides of the piston 106 through the by-pass 112 to balance pressures therein. The spring 109 will then react to force the piston 106 downwardly to some extent, whereupon the slight venting of the upper end of the cylinder will unbalance pressures on opposite sides of the piston and the operation referred to will be repeated. Thus a shaking action will be automatically imparted to the truck body to dislodge the material therefrom so that it will fall from the truck body. If the shaking action is not desired, the valve 113 may be left slightly open, thus bleeding air directly to the atmosphere when the lower end of the by-pass pipe 112 is uncovered by the piston 106. This arrests movement of the piston 106, and the piston will assume a position wherein the load on the piston rod 107 will be balanced by pressure tending to move the piston 106 upwardly. When the load has been dumped, the valve 122 will be returned to its normal position referred to, whereupon the truck body will move downwardly by gravity to its normal position.

If the truck load is to be dumped to one side of the truck, the operator will control the mechanism shown in Figure 3 before elevating the truck body. Assuming that the load is to be dumped from the left side of the truck, the operator will move the lever 149 to engage the rack 138 with the gear 50. He will then turn the valve 168 90° counter-clockwise from the position shown in Figure 3, thus venting the right end of the cylinder 131 and connecting the left end to the pressure source through pipe 163. The piston 136 will then move rearwardly and the rack 138 will rotate the gear 50 to turn the supplemental frame 20 and body 80 to the angular degree desired, up to approximately 80° from the normal position of the body. When such position is reached, the operator will turn the valve 168 sufficiently from the operative position referred to to prevent further rotation of the gear 50. This gear, keyed to the king pin 41, rotates the king pin and thus turns the plate 26, supplemental frame 20, and body 80. The body may be dumped in the manner referred to. It will be noted that the pipe 72 is of such length and flexibility as to permit turning of the king pin 41 through an angle of at least 80 degrees right or left from the normal position of the supplemental body 20 relative to the chassis 10.

Assuming that the body has been turned to the left in the manner described, that is by rotating the gear 50 in a counter-clockwise direction as viewed in Figure 3, the parts may be returned to normal position after the dumping operation merely by turning the valve 122 (Figure 4) to vent the cylinder 101 and permit the truck body to move downwardly by gravity and then by turning the valve 168 back to the position shown in Figure 3. Under such conditions, the left hand end of the cylinder 131 will be vented to the atmosphere through pipe 155, valve passage 170 and exhaust port 166. The right hand end of the cylinder 131 will be connected to the source of pressure through pipe 163, port 162, passage 169 and pipe 157. Thus the piston 136 will return to the position shown in Figure 3. The operator will have held the handle 149 (Figure 3) in the position shown to maintain engagement of the rack 138 and gear 50 to permit the motor 130 to perform the rotating operation referred to. When the parts are returned to normal position, the handle 149 will be released and the biasing spring 139 will disengage the rack 138 from the gear 50.

Assuming that the load in the truck body is to be dumped at the right side of the vehicle, the operator will turn the valve 168 (Figure 3) 90° counter-clockwise from the position shown in Figure 3 to energize the motor 130. This operation will be performed with the handle 149 released, and accordingly, the rack 138 will not be in engagement with the gear 50. Thus when the motor 130 is energized, the rack 138 moves freely past the gear 50 without imparting movement thereto.

When the piston 136 reaches the end of its stroke toward the right as viewed in Figure 3, the operator will then move the handle 149 toward the left to the position shown in Figure 3 to engage the rack 138 with the gear 50. He will then reverse the operation of the valve 168 to reverse the movement of the piston 136. Since the rack 138 will now be in engagement with the gear 50, the truck body will be rotated with the gear 50 in a clockwise direction as viewed in Figure 3. The load may then be dumped in the manner described at the left side of the vehicle. Thereafter, the operator will hold the handle 149 in the position shown in Figure 3 and move the valve 168 back to the position shown in Figure 3, thus energizing the motor 130 to restore the piston 136 to its normal position at the left hand end of the cylinder 131. The handle 149 then may be released and the parts will then be in the position shown in Figure 3, ready for the next operation. Any suitable means (not shown) may be employed wholly independently of the mechanism described for holding the truck body and supplemental frame 20 against rotation except when desired.

The fifth wheel structure shown in Figure 2 provides adequate means for supporting the load of the truck body and material therein, the fifth wheel structure being of substantial diameter and approximately equal in width to the frame structure 20 as shown in Figures 2 and 3. Adequate bearing surfaces are provided to support the load during the turning operation, and the fifth wheel structure forms a housing to receive lubricating grease to lubricate the contacting surfaces which rotate relative to each other. The controls for the two valve mechanisms 116 and 160 may be conveniently located in the cab of the vehicle to be easily operated by the driver.

I claim:

1. A truck comprising a chassis frame, a supplemental frame above said chassis frame, a body carried by said supplemental frame, a fifth wheel structure connecting said chassis and supplemental frames, a gear carried by said fifth wheel structure and fixed with respect to said supplemental frame, a rack laterally movable into and out of engagement with the teeth of said gear, means biasing said rack out of engagement with said gear, means for moving said rack laterally against said biasing means to engage said rack with said gear, and a power source for reciprocating said rack to rotate said gear and turn said supplemental frame and said body to a position in which material in said body can be unloaded to one side of the truck.

2. A truck comprising a chassis frame, a supplemental frame above said chassis frame, a body carried by said supplemental frame, a fifth wheel structure connecting said chassis and supplemental frames, a gear carried by said fifth wheel structure and fixed with respect to said supplemental frame, a rack bar mounted for lateral movement into and out of engagement with said gear, means biasing said rack bar out of engagement with said gear, lever means having an end engageable with said rack bar to move it against said biasing means into engagement with said gear, and a power source for reciprocating said rack bar to rotate said gear and turn said supplemental frame and said body to a position in which material in said body can be unloaded at one side of the truck.

3. A truck comprising a chassis frame, a supplemental frame above said chassis frame, a body carried by said supplemental frame, a fifth wheel structure connecting said chassis and supplemental frames, a gear carried by said fifth wheel structure and fixed with respect to said supplemental frame, a rack bar mounted for lateral movement into and out of engagement with said gear, means biasing said rack bar out of engagement with said gear, lever means having an end engageable with said rack bar to move it against said biasing means into engagement with said gear, a fluid pressure operated motor having a piston connected to said rack bar, and valve means for controlling the operation of said motor to rotate said gear to turn said supplemental frame and said body to a position in which material can be unloaded from said body at one side of the truck.

4. A truck comprising a chassis frame, a supplemental frame above said chassis frame, a body carried by said supplemental frame, a fifth wheel structure connecting said chassis and supplemental frames, a gear carried by said fifth wheel structure and fixed with respect to said supplemental frame, a rack bar mounted for lateral movement into and out of engagement with said gear, means biasing said rack bar out of engagement with said gear, lever means having an end engageable with said rack bar to move it against said biasing means into engagement with said gear, a rod connected to said lever means, an operating handle connected to said rod to reciprocate the latter to effect movement of said lever whereby said end thereof moves said rack into engagement with said gear, a fluid pressure operated motor having a piston connected to said rack bar, and a valve for admitting fluid pressure into either end of said motor to effect positive movement of said rack whereby said rack, when engaged with said gear, will turn said supplemental frame and said body to a position in which material in said body can be unloaded at one side of said truck.

5. A truck comprising a chassis frame, a supplemental frame above said chassis frame and normally occupying a position parallel thereto, a body carried by said supplemental frame, a fifth wheel structure connecting said chassis and supplemental frames and comprising a king pin fixed with respect to said supplemental frame and projecting therebelow, a gear carried by the lower end of said king pin, power means for rotating said gear comprising a rack having teeth engageable with said gear, means for supporting said power means for movement of said rack laterally toward and away from said gear, and means for controlling the position of said rack relative to said gear whereby, when said rack and said gear are engaged, said power means is operative to rotate said gear to turn said supplemental frame and said body horizontally out of their normal positions.

6. A truck comprising a chassis frame, a supplemental frame above said chassis frame and normally occupying a position parallel thereto, a body carried by said supplemental frame, a fifth wheel structure connecting said chassis and supplemental frames and comprising a king pin fixed with respect to said supplemental frame and projecting therebelow, a gear carried by the lower end of said king pin, power means for rotating said gear comprising a rack having teeth engageable with said gear, means for supporting said power means for movement of said rack laterally toward and away from said gear, means biasing said rack laterally away from engagement with said gear, and means for positively moving said rack against said biasing means into engagement with said gear whereby operation of said power means rotates said gear to turn said supplemental frame and said body horizontally at an angle to their normal positions.

7. A truck comprising a chassis frame, a supplemental frame above said chassis frame and normally occupying a position parallel thereto, a body carried by said supplemental frame, a fifth wheel structure connecting said chassis and supplemental frames and comprising a king pin fixed with respect to said supplemental frame and projecting therebelow, a gear carried by the lower end of said king pin, power means for rotating said gear comprising a rack having teeth engageable with said gear, means for supporting said power means for movement of said rack laterally toward and away from said gear, means biasing said rack laterally away from engagement with said gear, and lever means comprising a roller engageable with said rack bar to move it positively against said biasing means whereby operation of said power means will rotate said gear to turn said supplemental frame and said body horizontally at an angle to their normal positions.

8. A truck comprising a chassis frame, a supplemental frame above said chassis frame and normally occupying a position parallel thereto, a body carried by said supplemental frame, a fifth wheel structure connecting said chassis and supplemental frames and comprising a king pin fixed with respect to said supplemental frame and projecting therebelow, a gear carried by the lower end of said king pin, power means for rotating said gear comprising a rack having teeth engageable with said gear, means for supporting said power means for movement of said rack laterally toward and away from said gear, means biasing said rack laterally away from engagement with said gear, a bell crank lever pivotally supported intermediate its ends on said chassis frame and having a roller on one end engaging said rack at the side opposite the teeth thereof whereby turning movement of said bell crank lever in one direction will move said roller against said rack to move the latter positively against said biasing means into engagement with said gear, and remotely operable means connected to the other end of said bell crank lever for turning it in said direction to engage said rack with said gear whereby said power means is operable to rotate said gear to turn said supplemental frame and said body horizontally to positions at an angle to their normal positions.

9. A truck comprising a chassis frame, a supplemental frame above said chassis frame and normally occupying a position parallel thereto, said supplemental frame having normally front and rear ends, a body on said supplemental frame, means pivotally connecting said body to the rear end of said supplemental frame for upward swinging movement of said body on an axis transverse to said supplemental frame, a fifth wheel structure connecting said chassis and supplemental frames and comprising a hollow vertical king pin fixed with respect to said supplemental frame, a pipe connected to the upper end of said king pin, a pipe connected to the lower end of said king pin, a source of fluid pressure supply connected to said last-named pipe, a fluid pressure operated motor to which said first-named pipe is connected, said motor being connected between said supplemental frame and said body and energizable to move the forward end of the latter upwardly to dump material from the body, valve means for controlling the flow of fluid through said pipes, a gear carried by the lower end of said king pin, power means for rotating said gear comprising a rack having teeth engageable with said gear to rotate the latter and turn said supplemental frame and said body on the axis of said king pin, and means for moving the teeth of said rack into and out of engagement with said gear.

10. A truck comprising a chassis frame, a supplemental frame above said chassis frame and normally occupying a position parallel thereto, said supplemental frame having normally front and rear ends, a body on said supplemental frame, means pivotally connecting said body to the rear end of said supplemental frame for upward swinging movement of said body on an axis transverse to said supplemental frame, a fifth wheel structure connecting said chassis and supplemental frames and comprising a hollow vertical king pin fixed with respect to said supplemental frame, a pipe connected to the upper end of said king pin, a pipe connected to the lower end of said king pin, a source of fluid pressure supply connected to said last-named pipe, a fluid pressure operated motor to which said first-named pipe is connected, said motor being connected between said supplemental frame and said body and energizable to move the forward end of the latter upwardly to dump material from the body, valve means for controlling the flow of fluid through said pipes, a gear carried by the lower end of said king pin, power means for rotating said gear comprising a rack having teeth engageable with said gear to rotate the latter and turn said supplemental frame and said body on the axis of said king pin, means for supporting said power means for movement of said rack laterally toward and away from said gear, means biasing said rack away from said gear, and manually operable means for positively moving said rack against said biasing means to engage the teeth of said rack with said gear.

11. A truck comprising a chassis frame, a supplemental frame above said chassis frame and normally occupying a position parallel thereto, said supplemental frame having normally front and rear ends, a body on said supplemental frame, means pivotally connecting said body to the rear end of said supplemental frame for upward swinging movement of said body on an axis transverse to said supplemental frame, a fifth wheel structure connecting said chassis and supplemental frames and comprising a hollow vertical king pin fixed with respect to said supplemental frame, a pipe connected to the upper end of said king pin, a pipe connected to the lower end of said king pin, a source of fluid pressure supply connected to said last-named pipe, a fluid pressure operated motor to which said first-named pipe is connected, said motor being connected between said supplemental frame and said body and energizable to move the forward end of the latter upwardly to dump material from the body, valve means for controlling the flow of fluid through said pipes, a gear carried by the lower end of said king pin, power means for rotating said gear comprising a rack having teeth engageable with said gear to rotate the latter and turn said supplemental frame and said body on the axis of said king pin, means for supporting said power means for movement of said rack laterally toward and away from said gear, means for biasing said rack away from said gear, a lever pivotally supported intermediate its ends by said chassis frame, a roller carried by one end of said lever and engageable with the side of said rack opposite the teeth thereof whereby rotation of said lever in one direction will move said rack to engage the teeth thereof with said gear, and means connected to the other end of said lever for turning it in said direction.

12. A truck comprising a chassis frame, a supplemental frame above said chassis frame and normally occupying a position parallel thereto, said supplemental frame having normally front and rear ends, a body on said supplemental frame, means pivotally connecting said body to the rear end of said supplemental frame for upward swinging movement of said body on an axis transverse to said supplemental frame, a fifth wheel structure connecting said chassis and supplemental frames and comprising a lower circular plate carried by said chassis frame and an upper circular plate carried by said supplemental frame, and a hollow king pin having a vertical axis coaxial with said plates, said plates having engaging bearing surfaces whereby said upper plate is rotatable on its axis relative to said lower plate, a fluid pressure motor connected between said supplemental frame and said body and energizable for swinging the forward end of the latter upwardly, a fluid pressure conduit for supplying pressure fluid to said motor, said conduit including said king pin, a valve for controlling the flow of fluid through said conduit, said king pin having its upper end fixed to said upper plate, a gear fixed to said king pin below said lower plate, power means for rotating said gear comprising a fluid pressure operated motor including a piston and a rack carried thereby and having teeth engageable with said gear, said rack being laterally movable to move said teeth into and out of engagement with said gear, means for biasing the teeth of said rack out of engagement with said gear, and lever means for positively moving said rack laterally to engage the teeth thereof with said gear.

13. A truck comprising a chassis frame, a supplemental frame above said chassis frame and normally occupying a position parallel thereto, said supplemental frame having normally front and rear ends, a body on said supplemental frame, means pivotally connecting said body to the rear end of said supplemental frame for upward swinging movement of said body on an axis transverse to said supplemental frame, a fifth wheel structure connecting said chassis and supplemental frames and comprising a lower circular plate carried by said chassis frame and an upper circular plate carried by said supplemental frame, and a hollow king pin having a vertical axis coaxial with said plates, said plates having engaging bearing surfaces whereby said upper plate is rotatable on its axis relative to said lower plate, a fluid pressure motor connected between said supplemental frame and said body and energizable for swinging the forward end of the latter upwardly, a fluid pressure conduit for supplying pressure fluid to said motor, said conduit including said king pin, a valve for controlling the flow of fluid through said conduit, said king pin having its upper end fixed to said upper plate, a gear fixed to said king pin below said lower plate, power means for rotating said gear comprising a fluid pressure operated motor including a piston and a rack carried thereby and having teeth engageable with said gear, said rack being laterally movable to move said teeth into and out of engagement with said gear, means for biasing the teeth of said rack out of engagement with said gear, a lever pivotally supported intermediate its ends by said chassis frame, a roller carried by one end of said lever and engageable with the side of said rack opposite said teeth whereby, upon turning movement of said lever in one direction, said rack will be laterally moved to engage the teeth thereof with said gear, and means connected to the other end of said lever for turning it in said direction.

14. A truck comprising a chassis frame, a supplemental frame above said chassis frame, a body carried by said supplemental frame, means for supporting said supplemental frame for turning movement on a vertical axis relative to said chassis frame, a gear fixed with respect to said supplemental frame concentric with said vertical axis, a rack engageable with said gear, a power source connected to said rack to reciprocate it, means supporting said rack for lateral movement into and out of engagement with said gear whereby, upon operation of said power source said rack will rotate said gear or will move freely relative thereto depending upon whether said rack is in engagement with or disengaged from said gear, and means for effecting such lateral movement of the rack.

15. A truck comprising a chassis frame, a supplemental frame above said chassis frame, a body carried by said supplemental frame, means for supporting said supplemental frame for turning movement on a vertical axis relative to said chassis frame, a gear fixed with respect to said supplemental frame concentric with said vertical axis, a rack engageable with said gear, a power source connected to said rack to reciprocate it, means for supporting said rack for lateral movement into and out of engagement with said gear whereby upon operation of said power source said rack will rotate said gear or will move freely relative thereto depending upon whether said rack is in engagement with or disengaged from said gear, and means for controlling the position of said rack, such means comprising a spring biasing said rack away from said gear and a manually operable device for moving said rack against the tension of said spring into engagement with said gear.

16. A truck comprising a chassis frame, a supplemental frame above said chassis frame, a body carried by said supplemental frame, a fifth wheel structure connecting said chassis and supplemental frames, a gear carried by said fifth wheel structure and fixed with respect to said supplemental frame, a rack bar mounted for lateral movement into and out of engagement with said gear, means biasing said rack bar out of engagement with said gear, manually operable means operable for moving said rack bar against said biasing means into engagement with said gear, a fluid pressure operated motor having a piston connected to said rack bar, and valve means for controlling the operation of said motor to rotate said gear to turn said supplemental frame and said body to a position in which material can be unloaded from said body at one side of the track.

CLAUDE L. SHERBURNE.

REFERENCES CITED

The following references are of record in the file of this patent:

UNITED STATES PATENTS

| Number | Name | Date |
|---|---|---|
| 852,184 | Hunt | Apr. 30, 1907 |
| 1,298,028 | Finkelstein | Mar. 25, 1919 |
| 1,471,339 | Kinoshita | Oct. 23, 1923 |
| 1,479,309 | Mattix | Jan. 1, 1924 |
| 1,500,803 | Colbyson et al. | July 8, 1924 |
| 2,174,956 | Allison | Oct. 3, 1939 |
| 2,253,548 | Allison | Aug. 26, 1941 |